(12) United States Patent
Kim (10) Patent No.: US 7,668,499 B2
(45) Date of Patent: Feb. 23, 2010

(54) IMAGE READING APPARATUS

(75) Inventor: Won-taek Kim, Suwon-si (KR)

(73) Assignee: Samsung Electronics Co., Ltd., Suwon Si (KR)

( * ) Notice: Subject to any disclaimer, the term of this patent is extended or adjusted under 35 U.S.C. 154(b) by 407 days.

(21) Appl. No.: 11/305,208

(22) Filed: Dec. 19, 2005

(65) Prior Publication Data
US 2006/0170989 A1  Aug. 3, 2006

(30) Foreign Application Priority Data
Jan. 31, 2005  (KR) .................. 10-2005-0008603

(51) Int. Cl.
*G03G 15/00*  (2006.01)
(52) U.S. Cl. ................. 399/367; 399/374; 399/380; 271/3.17; 271/279; 271/291
(58) Field of Classification Search ............... 271/3.15, 271/3.17, 279, 291
See application file for complete search history.

(56) References Cited

U.S. PATENT DOCUMENTS 6,151,478 A * 11/2000 Katsuta et al. .............. 399/372

FOREIGN PATENT DOCUMENTS

| JP | 58166361 A | * | 10/1983 |
|----|------------|---|---------|
| JP | 63-117835  |   | 5/1988  |
| JP | 11-246060  |   | 9/1999  |
| JP | 2002-135699 | * | 5/2002 |
| JP | 2003-326801 | * | 11/2003 |
| JP | 2005-089152 | * | 7/2005 |

* cited by examiner

*Primary Examiner*—Ren Yan
*Assistant Examiner*—Matthew G Marini
(74) *Attorney, Agent, or Firm*—Staas & Halsey LLP (57) ABSTRACT

An image reading and/or reproducing apparatus, including a single sided document feeding tray and a double sided document feed tray to each supply a stack of documents to the apparatus; a document feeding unit to feed a document from a top of the stack of documents in the single sided document feeding tray, and to feed a document from a bottom of the stack of documents in the double sided document feeding tray; and an image scan unit to scan an image of the document fed from the document feeding unit. The apparatus further includes a reverse unit to position the double-sided document, fed by the document feeding unit, upstream of the image scan unit as the image scan unit completes a scanning of the image on a first side of the document such that the image scan unit may scan the image on a second side of the document. According to the above structure, reducing a time required to scan an image is possible.

4 Claims, 6 Drawing Sheets

IMAGE READING APPARATUS

CROSS-REFERENCE TO RELATED APPLICATION

This application claims the benefit of Korean Application No. 2005-8603, filed Jan. 31, 2005, in the Korean Intellectual Property Office, the disclosure of which is incorporated herein by reference.

BACKGROUND OF THE INVENTION

1. Field of the Invention

An aspect of the present invention relates to an image reading and/or reproducing apparatus. More particularly, the present invention relates to an image reading and/or reproducing apparatus that provides enhanced image reading speed by improving a document feeding structure of the image reading and/or reproducing apparatus.

2. Description of the Related Art

Figure 1:
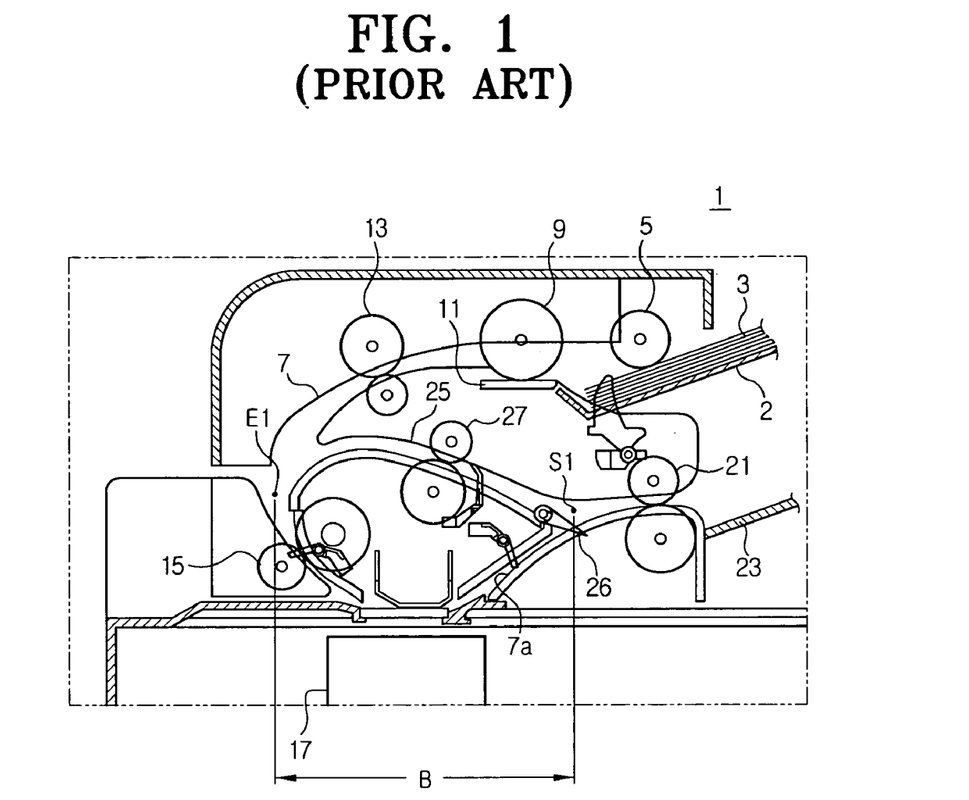
FIG. 1 is a schematic view of an operation status of a conventional image reading apparatus.

FIG. 1 is a view of a schematic operation of a conventional image reading apparatus 1. According to the conventional image reading apparatus, when reading a single-sided image, a document 3 supplied from a document feeding tray 2 is picked up by a pick-up roller 5 to be fed to a document convey path 7. The document 3, fed by the pick-up roller 5, passes an Automatic Document Feeder (ADF) roller 9 to be separated into a single sheet. A friction pad 11 is formed adjacently to an opposed surface of the ADF roller 9 to provide a frictional force when the document 3 is separated. The document 3, separated into a single sheet by the ADF roller 9, is then transmitted via convey rollers 13, 15 to an image scan unit 17.

A single side of the document 3 transmitted to the image scan unit 17 is read, then the document is conveyed to a discharge roller 21, where the document is loaded in order on a document discharge tray 23 by the discharge roller 21.

When reading a double-sided image, one side of the document 3 is scanned according to the same operational principles as are described above. The trailing end of the document 3 is positioned upstream of the image scan unit as the conveying direction of the document is reversed along a document reverse path 25 prior to the document being scanned again and then discharged to the document discharge tray 23 via the discharge roller 21. A path conversion device 26 is formed around the document reverse path 25 to selectively open the document reverse path 25 and the document convey path 7. The document 3, moved to the document reverse path 25, passes a reverse roller 27 and then U-turns at a position of the convey roller 15 such that the surfaces of the document 3 are reversed with respect to the image scan unit. The image scan unit 17 then reads an image on the document 3 to complete the double-sided image reading process.

A problem exists, however, in that, when reading the double-sided image, the order of the documents 3 that are discharged onto the document discharge tray 23 is necessarily different from the order of the documents 3 as they were loaded on the document feeding tray 2. The cause of the difference will be described in detail as follows.

Figure 2A:
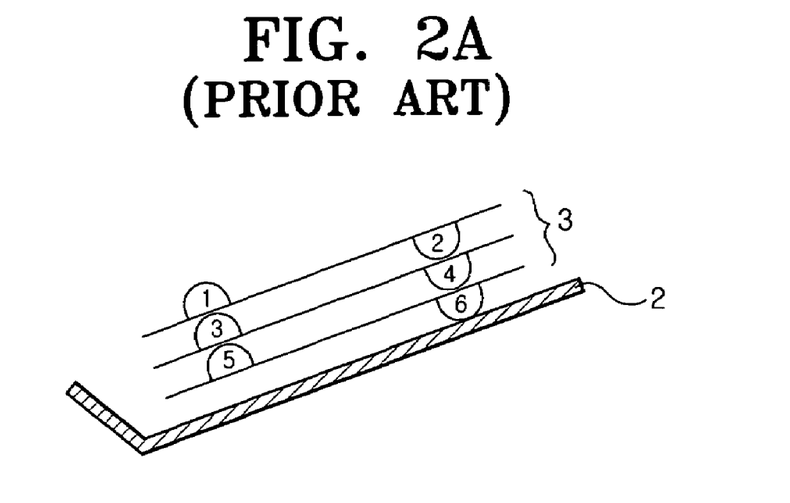
FIG. 2A is a view of a status of double-sided documents loaded on a document feeding tray of the conventional image reading apparatus shown in FIG. 1.
Figure 2B:
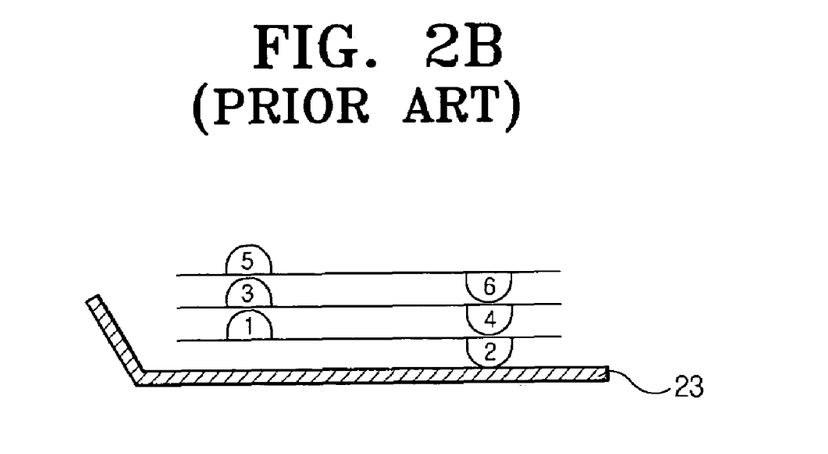
FIG. 2B is a view of an example of double-sided documents not arranged in a correct order of pages on the document discharge tray when the conventional image reading apparatus performs reading double-sided images.

FIG. 2A is a view of a status of double-sided documents loaded on the document feeding tray 2 of a conventional image reading apparatus 1, and FIG. 2B is a view of an example of the double-sided documents discharged from the apparatus once the conventional image reading apparatus performs a reading of both sides of the double-sided image.

Referring to FIG. 2A, when, for example, double-sided documents with 6 pages, 3 sheets are loaded, the double-sided documents are loaded on the document discharge tray 23 in order of pages 1, 2, 3, 4, 5, 6 (hereinafter, when the first image forming page is positioned at the uppermost side, this arrangement will be referred to as "face up", whereas when the first image forming page is positioned at the lowermost side, this arrangement will be referred to as "face down"), a plurality of the loaded documents are sequentially separated from the uppermost surface of the stack to perform a reading of both sides of the double-sided image as described above.

As illustrated in FIG. 2B, the documents are output in order of pages 2, 1, 4, 3, 6, 5 from the lowermost side on the document discharge tray 23 such that the pages are not arranged in a correct order.

In order to solve the above problem, as the reading of the double-sided images of the document 3 is completed, the document 3 is reversely conveyed via the document reverse path 25 and U-turned via the convey roller 15 to be discharged. In other words, the document 3 travels through a portion 7a of the document convey path 7 that corresponds to a section B between a starting point S1 and an ending point E1 of the document reverse path 25 three times.

When reading the double-sided images according to a conventional art as described above, additional reverse operations are performed to arrange the order of the discharged document pages. Therefore, a long time is required to read images.

SUMMARY OF THE INVENTION

An aspect of the present invention solves the above-mentioned and/or other problems and provides an image reading apparatus which reduces a time required to read double-sided images by improving a feeding structure of a document.

In order to achieve the above and/or other aspects, according to a first embodiment of the present invention, there is provided an image reading apparatus comprising a plurality of document feeding trays, an image scan unit to scan an image of the document fed from the document feeding trays, and a document feeding unit to selectively feed the document of a document stack on one of the plurality of document feeding trays from the uppermost surface of the stack of documents, and feeding the document of a document stack on the other document feeding tray from the lowermost surface of the stack of documents.

The image reading apparatus further comprises a reverse unit to reverse the document to a position that is upstream of the image scan unit as the image scan unit completes a scanning of the image of the document.

At least one of the document feeding trays, which feeds the document from the uppermost surface of the stack of documents and the document feeding tray which feeds the document from the lowermost surface of the stack of documents, is a single-sided document tray.

A single-sided document may be loaded face up on the single-sided document feeding tray.

The document feeding tray to feed the document from the lowermost surface of the stack of documents may be a double-sided document feeding tray. A double-sided document may be loaded face up or down on the double-sided document feeding tray.

The document feeding unit which feeds the document from the uppermost surface of the stack of documents may comprise a pick-up roller to pick up the document from the uppermost side of the document stack on the document feeding tray; a first separation roller to separate the picked-up document into a single sheet; and a first friction pad opposed to the first separation roller and to provide a frictional force in the separating of the document from the other documents into a single sheet.

The document feeding unit which feeds the document from the lowermost surface of the stack of documents may comprise a second separation roller to pick up the document from the lowermost surface of the stack of documents on the document feeding tray to separate into a single sheet, and a second friction pad opposed to the second separation roller to provide a frictional force in the separating of the double-sided document from the other documents into a single sheet.

A single-sided document sensor and a double-sided document sensor may be provided in each of the single-sided document feeding tray and the double-sided document feeding tray.

The image reading apparatus further comprises a plurality of document convey paths to guide the document fed from the plurality of document feeding trays to the image scan unit, an image scan path to discharge the document fed from the document convey path onto the document discharge tray via the image scan unit, and a document reverse path to feed the document, reversed from the document reverse unit, to a position that is upstream of the image scan unit.

The first document convey path and the second document convey path may be formed in substantially flattened U shapes and joined with each other at a position that is upstream of the image scan unit, a starting point of the document reverse path is formed at a position that is downstream of the image scan unit, and a finishing point of the document reverse path is connected with a joint point of the first and the second document convey paths.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
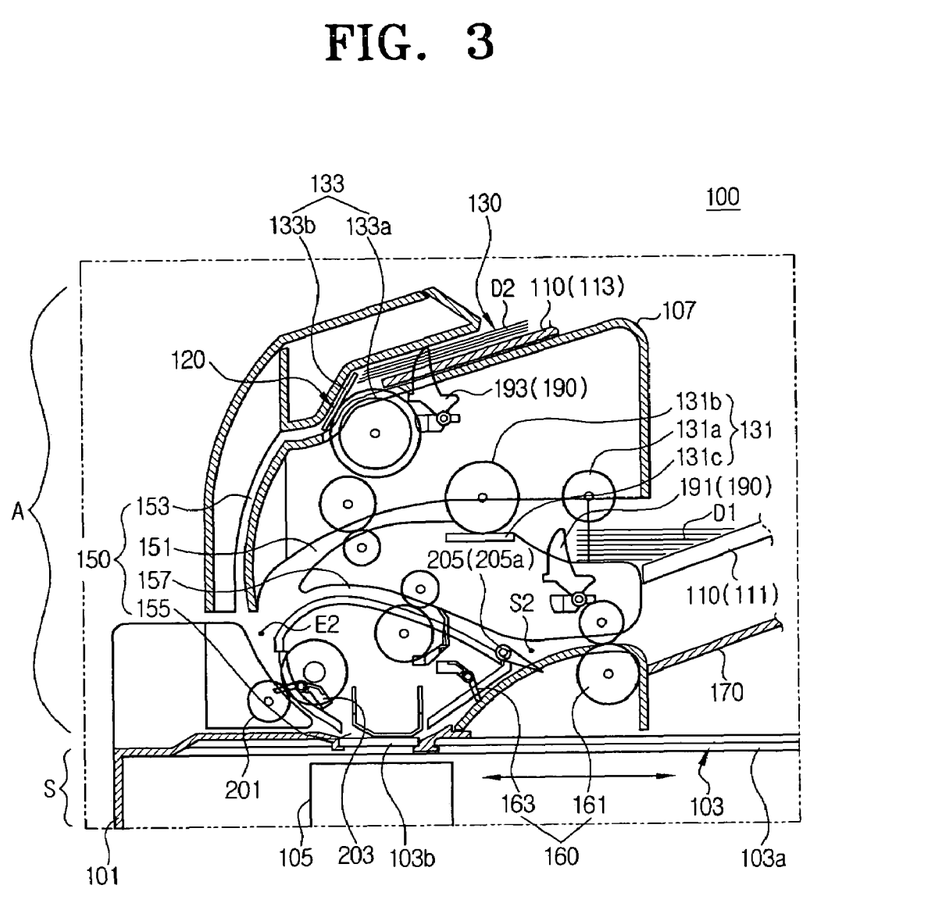
FIG. 3 is a view of an example of an image reading apparatus according to an embodiment of the present invention.

FIG. 3 is a view of an example of an image reading apparatus according to an embodiment of the present invention. Referring to FIG. 3, a double-sided image reading and/or reproducing apparatus 100 comprises an image scan part S and an automatic document feeding part A. The image scan part S comprises an image scan body 101, a document holder glass 103, and an image scan unit 105.

A document to be scanned is set on the document holder glass 103, which comprises a platen glass 103a and an automatic document feeder (ADF) glass 103b, as illustrated in FIG. 3. The platen glass 103a sets documents to a fixed position thereon, and the ADF glass 103b allows the documents D1, D2 that are sequentially fed by an automatic document feeding unit 120 to come into contact with the ADF glass 103b.

The image scan unit 105 is provided in the image scan body 101 and is provided in a lower portion of the body 101 below the ADF glass 103b so as to be positioned to read images of the documents D1, D2 that are continuously fed via the automatic document feeding unit 130. The image scan unit 105 reciprocates in linear directions as illustrated by the horizontal arrow of FIG. 3 to read an image of a document fixed on the platen glass 103a.

The automatic document feeding unit A comprises a feeding body 107, a document feeding tray 110, a document feeding unit 130, a document convey path 150, a document reverse unit 160, a document discharge tray 170, and a document sensor 190.

The document feeding tray 110 comprises a single-sided document feeding tray 111 to load single-sided documents D1 therein and a double-sided document feeding tray 113 to load double-sided documents D2 therein.

Figure 4A:
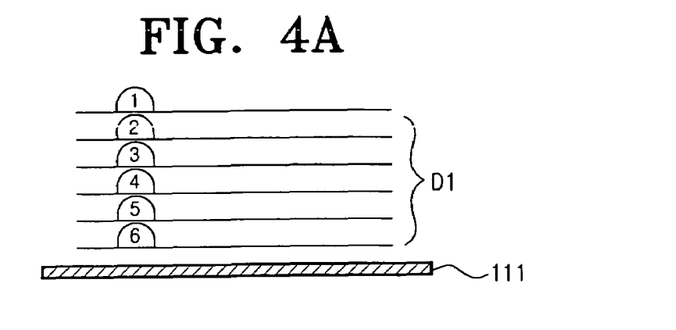
FIG. 4A is a view of a status of single-sided documents loaded face up on a single-sided document feeding tray according to an embodiment of the present invention.
Figure 4B:
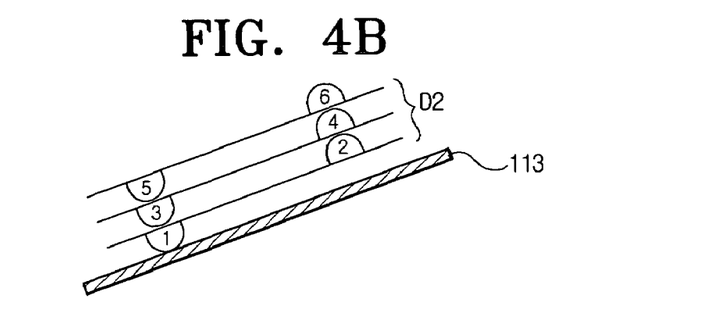
FIG. 4B is a view of a status of double-sided documents loaded face down on a double-sided document feeding tray according to an embodiment of the present invention.

FIG. 4A shows the documents D1 loaded face-up on the single-sided document feeding tray 111. Similarly, FIG. 4B shows the documents D2 loaded face-down on the double-sided document feeding tray 113.

The document feeding unit 130 comprises a single-sided document feeding unit 131 to feed the loaded document D1 from the single-sided document tray 111 and a double-sided document feeding unit 133 to feed the loaded document D2 from the double-sided document feeding tray 113.

The single-sided document feeding unit 131 feeds the uppermost document loaded on the single-sided document feeding tray 111 from the uppermost surface of the stack of documents D1 loaded thereon. The single-sided document feeding unit 131 comprises a pick-up roller 131a to pick up the uppermost document, a first separation roller 131b to insure that the document is separated from other documents into a single sheet, and a first friction pad 131c opposed to the first separation roller 131b to provide a frictional force in the separation operation.

The double-sided document feeding unit 133 comprises a second separation roller 133a to slide the lowermost double-sided document D2 out from under the stack of documents D2 loaded on the double-sided document feeding tray 113, and a second friction pad 133b opposed to the second separation roller 133a to provide a frictional force in the separation operation. The double-sided document feeding tray 113 may be inclined to a certain angle to smoothly feed the double-sided document D2 between the second separation roller 133a and the second friction pad 133b. A pick-up roller may be additionally provided as the aforementioned single-sided document feeding unit 133.

The document convey path 150 comprises a first convey path 151 to feed single-sided documents D1 from the single-sided feeding unit 131 to the image scan unit 105, a second convey path 153 to feed double-sided documents D2 from the double-sided document feeding unit 133 to the image scan unit 105, and an image scan path 155 to discharge the single sided document D1 or the double sided document D2 from either the first or second convey path 151 or 153, respectively, from the image scan unit 105 to the document discharge tray 170.

A document reverse path 157 is provided to convey double-sided documents D2 back to the image scan path 155 upstream of the image scan unit 105. Here, the conveying direction of the double-sided documents D2 is reversed while the documents travel along the image scan path 155 downstream from the image scan unit 105. The first and second convey paths 151, 153 intersect at the image scan path 155 upstream of the image scan unit 105. A starting point S2 of the document reverse path 157 is connected with the image scan path 155 downstream from the image scan unit 105, and a finishing point E2 of the document reverse path 157 is connected with the image scan path 155 upstream of the image reading unit 105. The finishing point E2 is connected with the point of intersection of the first and second paths 151, 153.

The document reverse unit 160 positions a trailing end of the document D2 upstream of the image scan unit 105 and reverses the conveying direction of document as the scanning of a first side of the document D2 is completed by the image scan unit 105. The document reverse unit 160 comprises a motor (not shown) to drive forward and backward, and a discharge roller 161 to rotate via a power of the motor. The discharge roller 161 discharges the documents D1 or D2 onto the document discharge tray 170 when rotating forward (clockwise), and reverses the document D2 when rotating backward (counterclockwise). A reverse sensor 163 may be added at a front side of the turning point S2 of the image scan path 155 to sense that a document D2 is located upstream of the reverse sensor 163 and to aid in a determination of an operation of the document reverse unit 160.

The document sensor 190 comprises a single-sided document sensor 191 to sense whether at least one single-sided document D1 is loaded on the single-sided document feeding tray 111 and a double-sided document sensor 193 to sense whether at least one double-sided document D2 is loaded on the double-sided document feeding tray 113. Here, a double-sided image scan mode or a single-sided image scan mode may be designated as an operational mode of the apparatus depending on the sensing condition of the single-sided document sensor 191 and the double-sided document sensor 193.

A scan roller 201 is provided at a front side of the image scan unit 105 to cause the single-sided document D1 to make a U-turn towards the image scan path 155 and to feed the double-sided document D2 onto the image scan path 155. A scan sensor 203 is provided to sense a position of the conveyed document D1 or D2 and to provide data to aid in the decision as to an operational timing point of the image scan unit 105. A path conversion device 205 is provided around the turning point S2 to traverse the document convey path. As shown in FIG. 3, the path conversion device 205 may comprise a gate bar 205a. If the path conversion device 205 is used, one end of the path conversion device 205 should be hinged such that the path conversion device 205 is biased to pivot downward so as to maintain an opened state of the document reverse path 157. However, the path conversion device 205 may be pivoted upward by a conveying force of the document D1 or D2 so as to open the image scan path 155 as the document D1 or D2 is conveyed via the image scan path 155.

With references to FIGS. 3, 4A, and 5A, the single-sided image scan operation will now be described. Referring to FIGS. 3 and 4A, when the single-sided documents D1 are loaded face-up on the single-sided document feeding tray 113, the pick-up roller 131a is driven depending on the sensing condition of the single-sided document sensor 191.

The pick-up roller 131a picks up an uppermost loaded single-sided document from the uppermost surface of the stack of documents in the single-sided document feeding tray 113, and the picked-up single-sided document D1 passes between the first separation roller 131b and the first friction pad 131c to insure that the document is separated from other documents into a single sheet.

The single-sided document D1 then passes the first convey path 151 and is made to make a curving U-turn by an operation of the scan roller 201 such that the single-sided document D1 is conveyed via the image scan path 155 to the image scan unit 105. After the image side of the document is read, the single-sided document D1 is discharged via the discharge roller 161 onto the document discharge tray 170 so as to complete the single-sided image reading process. The gate bar 205a, which acts as the path conversion device 205, according to this embodiment of the invention, rotates upward by the force of the document D1 hitting a face of the gate bar 205a as the document D1 is conveyed.

Figure 5A:
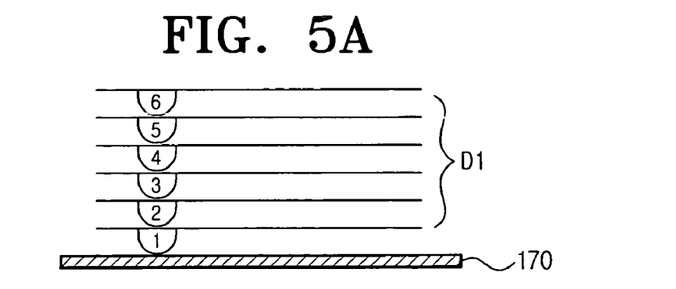
FIG. 5A is a view of a status of single-sided documents discharged on the document discharge tray when the single-sided documents are loaded as shown in FIG. 4A and fed from the uppermost surface of the stack of documents.

Once all of the single-sided documents D1 are discharged, as illustrated in FIG. 5A, the single-sided documents D1 are loaded on the document discharge tray 170 with the first image forming page, which is page 1, acting as the lowermost facing page. In other words, the single-sided document D1 is loaded from the lowermost surface of the stack of discharged documents D1 in order of pages 1, 2, 3, 4, 5, 6.

With references to FIGS. 3, 4B, 5B, the double-sided image scan operation will now be explained. Referring to FIGS. 3 and 4B, when the double-sided document D2 is loaded face-down on the double-sided document feeding tray 113, the second separation roller 133a rotates depending on the sensing condition of the double-sided document sensor 193 to sequentially slide the lowermost double-sided document D2 out from under the stack of documents D2 loaded on the double-sided document feeding tray 113. The slid-out double-sided document D2 is separated from the other documents into a single sheet by a frictional force of the friction pad 133b. The separated double-sided document D2 passes along the second convey path 153 and is made to make a U-turn by an operation of the scan roller 201 so as to be conveyed via the image scan path 155 to the image scan unit 105. After a first side (front page of the document on the double-sided document feeding tray 113) is read, the double-sided document D2 is conveyed through the image scan path 155, and the reverse sensor 203 senses that the double-sided document D2 is upstream of the reverse sensor 203. The discharge roller 161 then begins to rotate backward relative to the discharge direction a certain time after the reverse sensor 203 senses the position of the double-sided document D2. Accordingly, the double-sided document D2 is conveyed backward along the document reverse path 157 and is made to make a U-turn by the scan roller 201 such that the second side (a rear page of the document on the double-sided document feeding tray 113) faces toward the image scan unit 105, i.e., the double-sided document D2 is reversed. The double-sided document D2 is then conveyed along the image scan path 155 and passes the image scan unit 105 so that the second side of the document D2 is read. The double-sided document D2 is then discharged onto the document discharge tray 170.

Figure 5B:
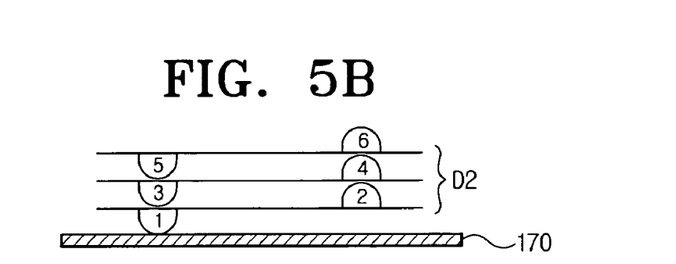
FIG. 5B is a view of a status of double-sided documents discharged on the document discharge tray when the double-sided documents are loaded face down as shown in FIG. 4B and fed from the lowermost surface of the stack of documents.

When all of the double-sided documents D2 are discharged, the first image forming page, i.e., page 1, of the double-sided documents D2, is positioned face down at the lowermost surface of the stack of documents D2 on the document discharge tray 170 as shown in FIG. 5B with the other documents D2 similarly aligned. In other words, the double-sided documents D2 are loaded face down in order of pages 1, 2, 3, 4, 5, 6 on the document discharge tray 170 in the same order as the order of the pages of the documents D2 when the documents were loaded on the double-sided document feeding tray 113.

The image reading apparatus 100 as described above may be coupled with a multi-operational peripheral device such as a copier with combination of an image forming device (not shown).

According to the above noted embodiments of the document feeding tray 110, documents are fed from a lowermost surface of the stack of documents in the double-sided document feeding tray 113, whereas documents are fed from an uppermost surface of the stack of documents in the single sided document feeding tray 111. However, this arrangement should not be considered as limiting. The document feeding tray 110 may be differently applied. For example, both document feeding trays 111, 113 may be used as a single-sided document feeding tray. Additionally, the double-sided document D2 may be loaded with documents either face-up or face-down.

Figure 5C:
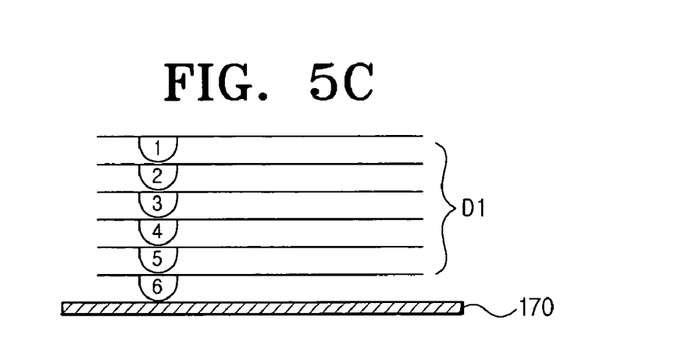
FIG. 5C is a view of a status of single-sided documents discharged on the document discharge tray when the single-sided documents are loaded face up as shown in FIG. 4A and fed from the lowermost surface of the stack of documents.

As another example in another embodiment, FIG. 5C is a view of the single-sided documents D1 after they have been discharged on the discharge tray 170—in the case where the documents D1 would have been loaded face up on the single-sided document feeding tray 111 and fed from the lowermost surface of the stack of documents D1. As shown in FIG. 5C, the documents D1 were discharged in a reverse order of the pages, as compared to the original order of the pages, with the image forming pages facing down. Thus, when the single-sided documents D1 are fed from the lowermost surface of the stack of documents D1, no problem exists with respect to the discharge order.

However, the printing speed may be slowed if a multi-operational peripheral device is attached to the image reading apparatus 100 that adds an image forming part operating based on the information read by the image reading apparatus 100. In other words, since the image-scanned pages are in order of 6, 5, 4, 3, 2, 1, a printing operation may have to be performed backward with respect to the order of the pages in order to arrange for a correct discharge order. In this case, a long time may be required for the printing operation. Moreover, while the embodiments discussed herein refer to documents with 6 pages, a scanning operation of 100 pages may require a much longer time for the printing operation.

Figure 4C:
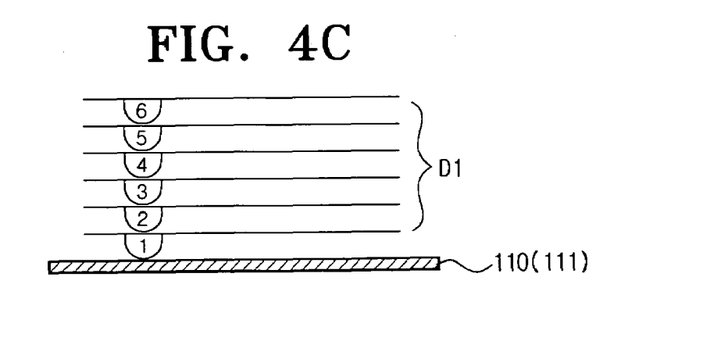
FIG. 4C is a view of an example of single-sided documents loaded face down on a single document feeding tray according to an embodiment of the present invention.

The single-sided document D1 may be loaded face-down on the document feeding tray 110 (in fact, either document feeding tray 113 or 111). FIG. 4C is a view of an example of the single-sided document D1 loaded in the face-down form on the document feeding tray 111. As a surface of the page without an image thereon faces up, the surface of the page having the image thereon cannot face toward the image scan unit 105 as the document passes along the image scan path whether the document is fed from the uppermost surface of the stack of documents or from the lowermost surface of the stack of documents. In this case, if the single-sided document D1 is reversed, as in the scan process of the double-sided document D2, this embodiment may be useful in image scanning or reproducing operations. However, this embodiment may also slow the image scan speed. Therefore, when the single-sided document D1 is to be scanned, the single-sided document D1 should be loaded face-up and the documents should be fed from the uppermost surface of the stack of documents D1.

Figure 4D:
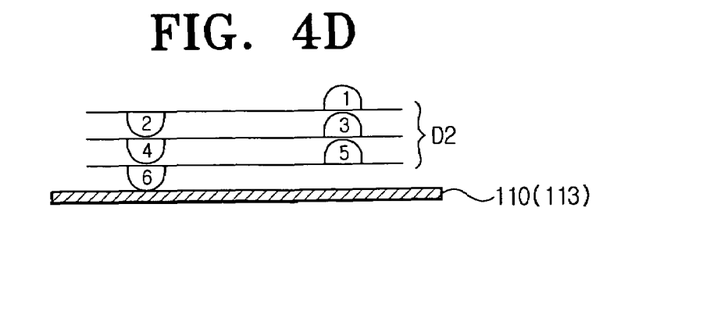
FIG. 4D is a view of an example of double-sided documents loaded face up on a double-sided document feeding tray according to an embodiment of the present invention.
Figure 5D:
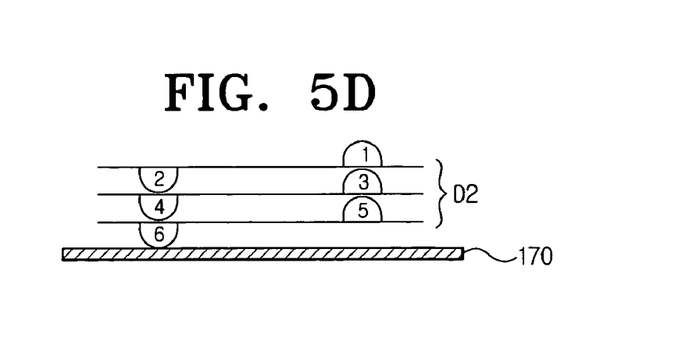
FIG. 5D is a view of a status of double-sided documents discharged on the document discharge tray when the double-sided documents are loaded face up as shown in FIG. 4D and fed from the lowermost surface of the stack of documents.

FIG. 4D is a view of an example of the double-sided documents D2 loaded face-up form on the document feeding tray 113, and FIG. 5D is a view of an example of the double-sided documents D2 after they have been discharged on the discharge tray 170 and when the double-sided documents D2, loaded as shown in FIG. 4D, are fed from the lowermost surface of the stack of documents D2. As shown in FIGS. 4D and 5D, the double-sided documents D2 on the document feeding tray 110 are loaded in the same order as the order of the double-sided documents D2 when they are discharged onto the discharge tray 170. However, since the document is scanned in order of pages 6, 5, 4, 3, 2, 1, the printing speed is slowed, as is described above. Accordingly, when the double-sided document D2 is scanned, the double-sided document D2 on the document feeding tray 110 should be fed from the lowermost surface of the stack of documents D2.

As a reference, when the double-sided documents D2, loaded on the document feeding tray 110, are fed from the uppermost surface of the stack of documents D2, the following examples explain the problem solved by the invention.

Figure 5E:
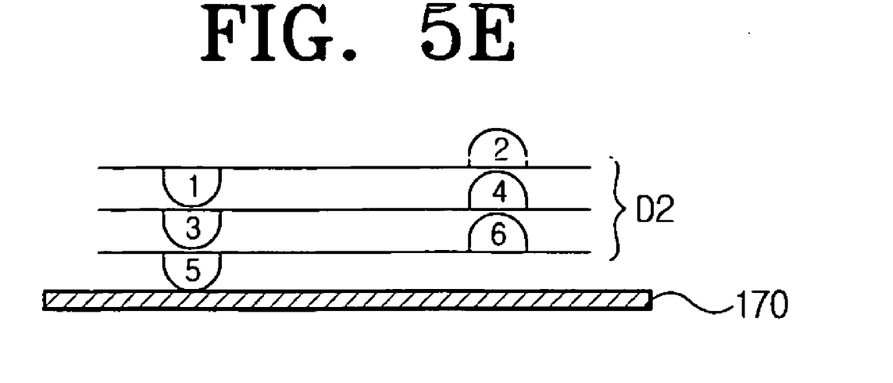
FIG. 5E is a view of a status of double-sided documents discharged on the document discharge tray when the double-sided documents are loaded face down as shown in FIG. 4B and fed from the uppermost surface of the stack of documents.

FIG. 5E is a view of an example of the double-sided documents D2 discharged on the discharge tray 170 when the double-sided documents D2 are loaded face-down as shown in FIG. 4B and fed from the uppermost surface of the stack of documents D2. The double-sided documents D2 are discharged on the discharge tray 170 in order of pages 5, 6, 3, 4, 1, 2 from the lowermost surface of the discharged stack of documents D2.

Figure 5F:
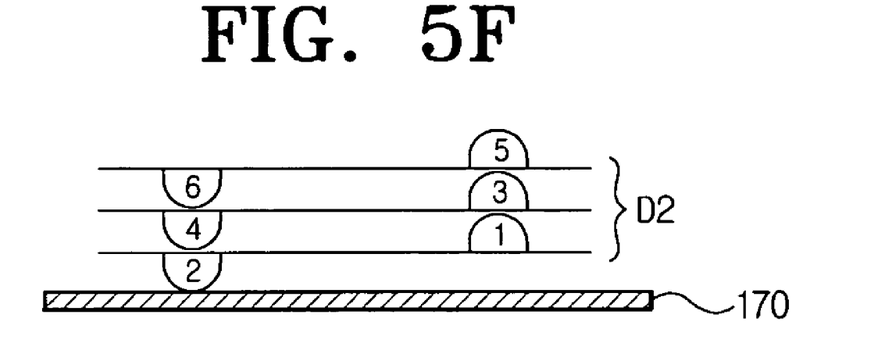
FIG. 5F is a view of a status of double-sided documents discharged on the document discharge tray when the double-sided documents are loaded face up as shown in FIG. 4D and fed from the lowermost surface of the stack of documents.

Similarly, FIG. 5F is a view of an example of the double-sided documents D2 discharged on the discharge tray 170 when the double-sided documents D2 are loaded face-up as shown in FIG. 4D and fed from the uppermost surface of the stack of documents D2. The double-sided documents D2 are discharged on the discharge tray 170 in order of pages 2, 1, 4, 3, 6, 5 from the lowermost surface of the discharged stack of documents D2.

If the image reading apparatus according to embodiments of the present invention is applied, reducing a time to read images is possible since the conventional reverse operation is improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image reading and/or reproducing apparatus, comprising:
    a single sided document feeding tray and a double sided document feeding tray to each supply a stack of documents to the apparatus;
    a document feeding unit to selectively feed a document from a top of the stack of documents in the single sided document feeding tray, or a document from a bottom of the stack of documents in the double sided document feeding tray;
    an image scan unit to scan an image of the document fed by the document feeding unit; and
    a plurality of document convey paths to guide the documents fed from the document feeding unit to the image scan unit such that the order of the documents when the documents were loaded into the double sided document feeding tray is retained when the documents are discharged from the apparatus, and the order of the documents when the documents were loaded into the single sided document feeding tray is reversed when the documents are discharged from the apparatus, and a first side of each document that is loaded face down into the double sided document feeding tray is also face down when the document is discharged from the apparatus;
    a reverse unit to position the double-sided document, fed by the document feeding unit, upstream of the image scan unit as the image scan unit completes a scanning of the image on a first side of the document such that the image scan unit may scan the image on a second side of the document;
    a document discharge tray onto which fully scanned documents are discharged;
    an image scan path to guide the documents from the document convey path to the document discharge tray via the image scan unit; and
    a document reverse path to feed the document from the document reverse unit to the position upstream of the image scan unit;
    wherein the plurality of document convey paths comprise a first document convey path and a second document convey path, both of which have a U shape, intersecting at a position upstream of the image scan unit; and
    wherein an ending point of the first document convey path, an ending point of the second document convey path, an ending point of the document reverse path, and a starting point of the image scan path intersect at the position upstream of the image scan point.

2. An image reading and/or reproducing apparatus, comprising:
    a single sided document feeding tray and a double sided document feeding tray to each supply a stack of documents to the apparatus;
    a document feeding unit to selectively feed a document from a top of the stack of documents in the single sided document feeding tray, or a document from a bottom of the stack of documents in the double sided document feeding tray;
    an image scan unit to scan an image of the document fed by the document feeding unit;
    a reverse unit to position the double-sided document, fed by the document feeding unit, upstream of the image scan unit as the image scan unit completes a scanning of the image on a first side of the document such that the image scan unit may scan the image on a second side of the document;
    a plurality of document convey paths to guide the documents fed from the document feeding unit to the image scan unit;
    a document discharge tray onto which fully scanned documents are discharged;
    an image scan path to guide the documents from the document convey path to the document discharge tray via the image scan unit; and
    a document reverse path to feed the document from the document reverse unit to the position upstream of the image scan unit;
    wherein the order of the documents when the documents were loaded into the double sided document feeding tray is retained when the documents are discharged from the apparatus, and the order of the documents when the documents were loaded into the single sided document feeding tray is reversed when the documents are discharged from the apparatus, and a first side of each document that is loaded face down into the double sided document feeding tray is also face down when the document is discharged from the apparatus;
    wherein each document in the stack of documents in the single-sided document feeding tray is loaded face up on the single-sided document feeding tray;
    wherein the plurality of document convey paths comprise a first document convey path and a second document convey path, both of which have a U shape, intersecting at a position upstream of the image scan unit; and
    wherein an ending point of the first document convey path, an ending point of the second document convey path, an ending point of the document reverse path, and a starting point of the image scan path intersect at the position upstream of the image scan point.

3. An image reading and/or reproducing apparatus, comprising:
    a single sided document feeding tray and a double sided document feeding tray to each supply a stack of documents to the apparatus;
    a document feeding unit to selectively feed a document from a top of the stack of documents in the single sided document feeding tray, or a document from a bottom of the stack of documents in the double sided document feeding tray;
    an image scan unit to scan an image of the document fed by the document feeding unit;
    a reverse unit to position the double-sided document, fed by the document feeding unit, upstream of the image scan unit as the image scan unit completes a scanning of the image on a first side of the document such that the image scan unit may scan the image on a second side of the document;

a plurality of document convey paths to guide the documents fed from the document feeding unit to the image scan unit;

a document discharge tray onto which fully scanned documents are discharged;

an image scan path to guide the documents from the document convey path to the document discharge tray via the image scan unit; and a document reverse path to feed the document from the document reverse unit to the position upstream of the image scan unit;

wherein the order of the documents when the documents were loaded into the double sided document feeding tray is retained when the documents are discharged from the apparatus, and the order of the documents when the documents were loaded into the single sided document feeding tray is reversed when the documents are discharged from the apparatus, and a first side of each document that is loaded face down into the double sided document feeding tray is also face down when the document is discharged from the apparatus;

wherein each document in the stack of documents in the single-sided document feeding tray is loaded face up on the single-sided document feeding tray;

wherein the reverse unit comprises:

a discharge roller to selectively discharge a document to the document discharge tray or to reverse the document so as to convey the document along the document reverse path;

a motor to drive the discharge roller; and a reverse sensor arranged between the discharge roller and the image scan unit to determine whether to drive the discharge roller so as to discharge the document or reverse the document, based on the presence of a document near the discharge roller.

4. The apparatus of claim 3, wherein, if the reverse sensor detects the presence of a double sided document, and the double sided document has previously been conveyed along the reverse path, the discharge roller discharges the double sided document to the document discharge tray.

* * * * *

UNITED STATES PATENT AND TRADEMARK OFFICE
CERTIFICATE OF CORRECTION

| | | |
|---|---|---|
| PATENT NO. | : 7,668,499 B2 | |
| APPLICATION NO. | : 11/305208 | |
| DATED | : February 23, 2010 | |
| INVENTOR(S) | : Won-taek Kim | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 838 days.

Signed and Sealed this
First Day of March, 2011

David J. Kappos
*Director of the United States Patent and Trademark Office*